United States Patent
Pollinger et al.

(10) Patent No.: US 7,424,857 B2
(45) Date of Patent: Sep. 16, 2008

(54) MARINE TRANSPORT SYSTEM AND PROCESSING STRUCTURES

(76) Inventors: Paul George Pollinger, 3713 Fulton St. NW., Washington, DC (US) 20007; Timothy Alan McAllister, 535 Benforest Dr., Severna Park, MD (US) 21146

(*) Notice: Subject to any disclaimer, the term of this patent is extended or adjusted under 35 U.S.C. 154(b) by 0 days.

(21) Appl. No.: 11/515,845

(22) Filed: Sep. 6, 2006

(65) Prior Publication Data
US 2007/0039531 A1 Feb. 22, 2007

Related U.S. Application Data

(62) Division of application No. 11/101,509, filed on Apr. 8, 2005, now abandoned.

(60) Provisional application No. 60/563,469, filed on Apr. 20, 2004.

(51) Int. Cl.
*B63B 35/28* (2006.01)
(52) U.S. Cl. .................................................. 114/26
(58) Field of Classification Search ................ 114/26
See application file for complete search history.

(56) References Cited

U.S. PATENT DOCUMENTS

| 1,440,065 | A | * | 12/1922 | Donnelly | 414/140.3 |
|---|---|---|---|---|---|
| 1,675,606 | A | * | 7/1928 | Henry | 440/90 |
| 3,903,825 | A | * | 9/1975 | Hamy | 114/77 R |
| 5,488,918 | A | * | 2/1996 | Johnson et al. | 114/61.27 |
| 5,505,585 | A | * | 4/1996 | Hubbard | 414/803 |
| 5,803,659 | A | * | 9/1998 | Chattey | 405/8 |
| 5,967,072 | A | * | 10/1999 | Leary | 114/77 R |
| 2004/0134402 | A1 | * | 7/2004 | Schmidt et al. | 114/61.15 |

* cited by examiner

*Primary Examiner*—Stephen Avila (57) ABSTRACT

This invention relates to marine transport systems and processing structures in furtherance thereof. More particularly, the invention relates to a marine transport system in which cargo of all types is transported between shallow draft brown water ports and deep draft blue water ports on the route, and a processing in which the cargo is marshaled onto and the transport vessel at the first port, carried through defined channels and locks, copes with sea states in blue water and discharges the cargo at the second port with no transshipment in between ports. In addition by matching the elements of the vessel, the channel, the lock, the slip, and the crane; more efficient trade, business and markets for cargo served by water links can now be utilized.

2 Claims, 8 Drawing Sheets

Hull Strengthening

FIG. 1
Marine Transportation System

Tow in Open Deep Draft Blue Water
FIG.2a

Tow in Shallow Draft
FIG.2b

FIG. 3
Hull Concept

Fig. 4a
Showing containers in deep draft

Fig. 4b
Showing containers in shallow draft

FIG. 4
Vessel Carrying Containers

Fig. 4c
Showing short hull and tug in lock

Fig. 4d
Showing long hull filling lock

FIG. 5
Hull Strengthening

FIG. 6
Slip and Landside Arrangement

FIG. 7 Crane Matched To Slip And Both Matched To Vessel at 20' Draft

MARINE TRANSPORT SYSTEM AND PROCESSING STRUCTURES

This application is a division of application Ser. No. 11/101,509, filed Apr. 8, 2005 now abandoned. Priority of U.S. Provisional patent application Ser. No. 60/563,469 filed, Apr. 20, 2004, incorporated herein by reference is hereby claimed.

THE STATE OF THE ART

At the present time, transport of cargo by water is, as a general rule, the most economical mode of transport available. In many instances, however, the cost differentials between water and land/trucking/rail transport in combination with the time differences similarly involved, render land/trucking/rail transport preferable to water transport. If the cost of water transport can be substantially reduced, the use of water transport in preference to land/trucking/rail transport would be increased to the advantage of the substantial US population located along the water trade lanes as well as the substantial maritime investment in the nation. Historically it was that way and the most societies developed along some of these water trade lanes. What was once deep enough water is no longer as much in demand as highway and rail services progressed and the character of new cargo changed from bulk commodities such as coal, wheat, and chemicals to break bulk and containerized items. After years of barging it appears that these traditional hulls are approximately 35 feet wide and 195 long. To increase capacity the barges are lashed together until they engage the limits of the inland waterways. These limitations have to do with water depth in the channel and the lock, lock width, shallow draft and open sea state operating conditions, efficiencies of handling cargo in the hold, transshipping, efficiencies of loading and off loading cargo between the vessel and the landside, and standardization.

In view of the limits of the present systems, this invention permits cargo of all types to be better transported on the present available waterways and trade lanes and that in particular ocean containers will arrive at inland ports and markets through a system and processing that will reflect the economic value of the waterways.

SUMMARY OF INVENTION

The marine transport system and processing structures of this invention address varying the design and outfitting of the barging vessels, shallow draft waterways channels, locks, slips, cranes, and sea state ports to comply with the requirements of the trade lanes over which cargo would normally be shipped. It further comprises the processing of cargo within the system as the cargo travels between point A, where the cargo is loaded or unloaded, and point B where the cargo is unloaded or loaded. Importantly this processing is achieved without transshipping. The elimination of transshipment is achieved by strengthening the marine transport system and processing structures barging vessel.

DESCRIPTION

Figure 1:
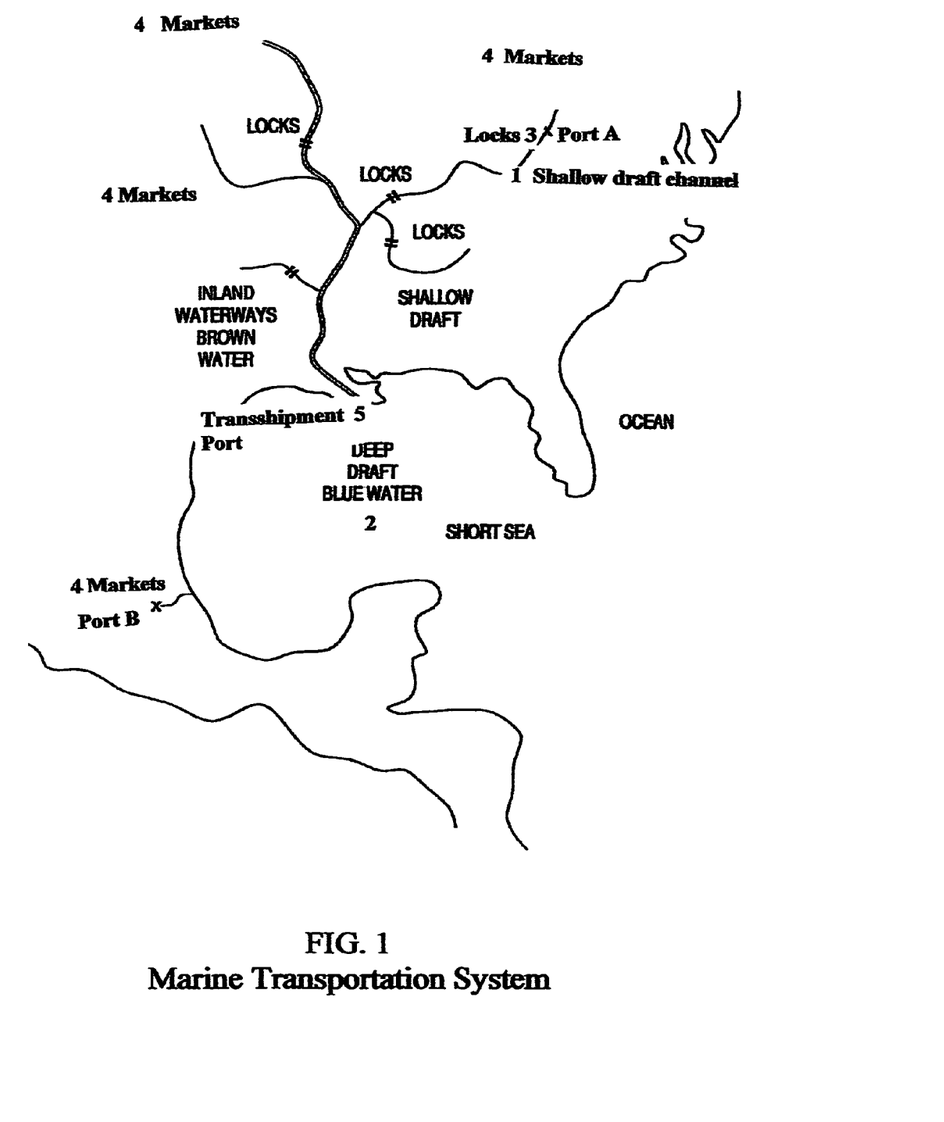
FIG. 1 Is a view of the marine transport system showing the shallow draft part of the system and the deep draft part of the system linking Port A and Port B.

FIG. 1 Transportation System

Figure 2A:
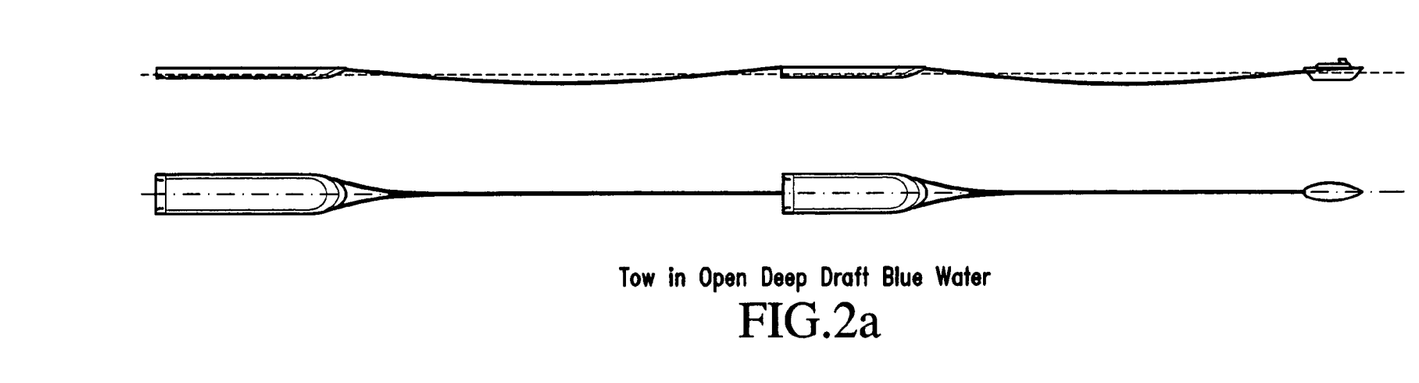
FIG. 2a Is a side elevation view a plan view of the cargo carrying arrangement in deep draft blue water.
Figure 2B:
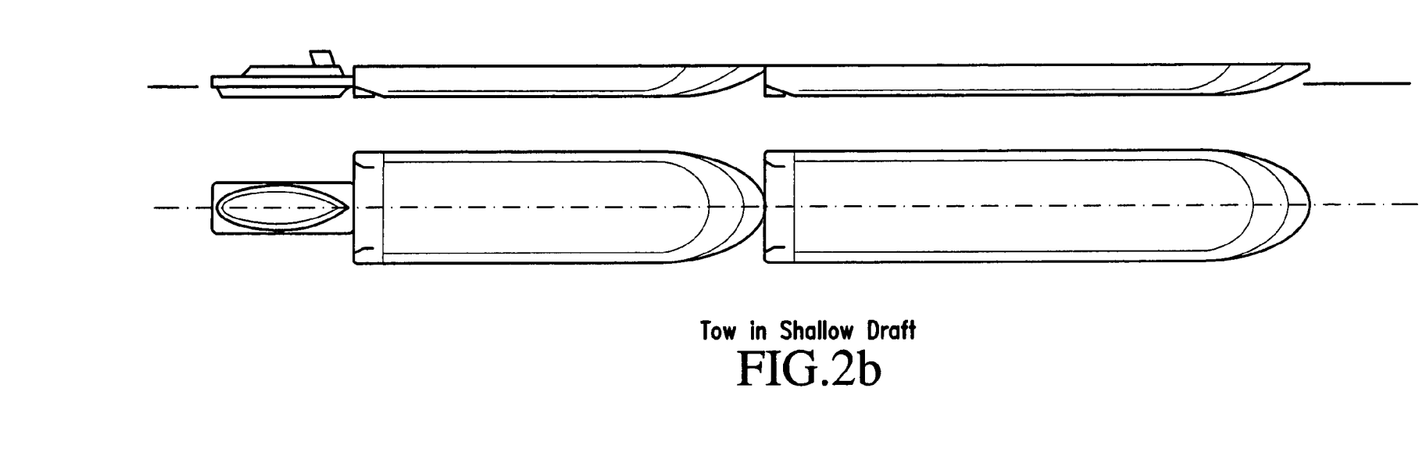
FIG. 2b Is a side elevation view and a plan view of the cargo carrying arrangement in shallow draft water.

The marine transport system and processing structures vessel design of the hulls is designed to accommodate from the minimum shallow draft 1 part of the system, often referred to as brown water of the inland waterways, to the other extreme of the system which is the deep waters 2 measured in sea state conditions and often referred to as blue water and then return to a another shallow draft portion of the route and end at Port B. This shallow draft depth is commonly 9' but shallower or deeper depths are possible. In some cases the shallow draft may be naturally occurring. More common is that draft maintained on the inland waterways by the US Army Corps of Engineers (USACE). To achieve the desired depths the USACE has provided a water supply by building dams behind which there is water "pool" in which is established a channel of a prescribed depth. These channels are then linked by locks so that vessel can travel from one channel to an adjoining channel. Thus a vessel that draws the minimum available draft can be said to accommodate or "match" the minimum channel and enter the lock 3 with USACE approved clearance. By matching the proposed vessel to the channel draft and the lock size, the vessel reaches ports which serve markets 4 for bulk and especially ocean containers that have not been served before by water borne vessels capable of carrying quantities of such product. The proposed marine transport system and processing structures invention does not have to transship at ports 5. Traditionally, shallow draft vessels proceed towards deeper water and reach the relatively sheltered waters of the lower river (where brown water and blue water overlap) which is the zone where they have to transship cargo to deep draft vessels. Bypassing transshipment at ports allows the invention to eliminate the usual 14 or 16 processing steps needed at such ports. Bylo states that containerized cargo is handled 14 times at a typical port and breakbulk cargo is handled 16 times. In many instances, the containers and other cargo is transshipped from a truck, train, or shallow draft vessel at a port where the conveyances meet and cargo is loaded onto a deep draft vessel. The cargo is then shipped to a more distant port where it is unloaded to a truck or train that proceeds to the final destination. Bypassing transshipment also means that the need for "fleeting"—temporary storage—of barges in the stream is eliminated which is an added savings of processing steps. The logistical complexities of coordinating the arrival and departure of several vessels to transport the transshipped cargo are also eliminated. In deep draft ports, congestion referenced by Hubbard is also reduced. The proposed marine transport system and processing structures processes the cargo closer to the cargo's origination or destination thus providing shorter trips for trucks or trains. This is particularly advantageous for short haul truckers that want to connect their market to a port and return to their market in one work day. Even more efficient processing at the many ports addressed by Bylo does not eliminate problems altogether as does the proposed invention. The proposed marine transport system and processing structures does not have to utilize Panamax or deep water ports as described by Hubbard. This is possible because there are thousands of miles of inland waterways and land similar to Port A or Port B sites. Panamax vessels are not suited physically or economically to the transportation system here. Not only is it water draft that prevents the deep draft Panamax vessel from reaching shallow draft Ports A or B but their superstructure is not matched to the available air draft and they will encounter the underside of a bridge or power cables. The proposed marine transport system and processing structures is designed to operate in deep draft blue water as well as shallow draft brown water. Johnson addresses traditional inland barges but for shallow draft only and proposed marine transport system and processing structures differs substantially from Johnson's barge flotilla FIG. 2 Cargo Carrying Arrangement The length of the proposed marine transport system and processing structures is a 1,200' long tow comprising a tug and two barges of dimensions and draft described elsewhere. Towing this configuration in a sea state FIG. 2a is easily accomplished in comparison to a traditional tow. In blue water sea state conditions the tug tows barges at a distance behind it in single file attached by long tow cables. The traditional river tow comprised of similar surface area dimensions is made up of a tug and 15 traditional barges. Towing 15 barges increases open water seamanship challenges and even were the river barges strengthened to handle the sea state, being behind one tug adds seamanship challenges beyond present practice. The proposed marine transport system and processing structures invention has a cargo carrying arrangement that does not waste cargo space because it is one large entity meant to maximize cargo carrying capacity. Johnson's flotilla arrangement is comparable to the proposed invention FIG. 2b in size except for the wasted cargo space. To pass through the locks with 15 barges in tow, the Johnson tow is "cut." One part of the Johnson tow is approximately 600' long and consists of 9 barges, (3 barges wide and 3 barges long). The second part consists of 6 barges (3 barges wide and 2 barges long) plus the tug. In passing through the lock, the differences in the two inventions are clear. With so many barge structures, Johnson cargo carrying space is minimized by the many sides of the flotilla barges in contrast to the wide open single barge configuration of the proposed vessel. If a cross section of Johnson's lashed 3 barges were imposed on a cross section of the proposed one-barge invention, in the deeper draft inland waterway it would show that the multiple sides of the flotilla barges protrude into the cargo hold causing wasted cargo space especially when positioning ocean container rails. This prior art focuses only on shallow and deeper, brown water operations which is substantially different from the proposed invention which focuses on shallow draft as well as deep draft, blue water cargo transportation. In the proposed marine transport system and processing structures invention the propulsion system is in the tug which is behind in shallow draft water and ahead of the hull in deep, blue water. This arrangement enables the cargo body to match the lock or slip and does not add to the width of the tow as it does with Hamy's invention whose tow extends beyond the width of the assembled train hull. In a river lock, this would represent significant lost cargo space. The proposed marine transport system and processing structures, barge tow arrangement with tug, requires no special wide propulsion system which sacrifices cargo space for the length of the tow. The proposed vessel can be self propelled to utilize the additional cargo space on each side of the tug but that gained space alters the advantages of being a barge. Henry claims a boat, more precisely a shallow draft tug and four barges making up a shallow draft tow. The barges are strengthened by girders as spacers between the barges so as to make a channel for water to flow between the barges and then tunneled under part of the tug hull to thus supply water to a powered paddle wheel of that date. While Henry would work in very shallow draft water the creation of a pooled or dredged channel and/or the naturally deeper water between Ports A and B has permitted paddle wheel and propeller driven vessels to operate without sacrificing cargo space to supply water to the propulsion system.

Figure 3:
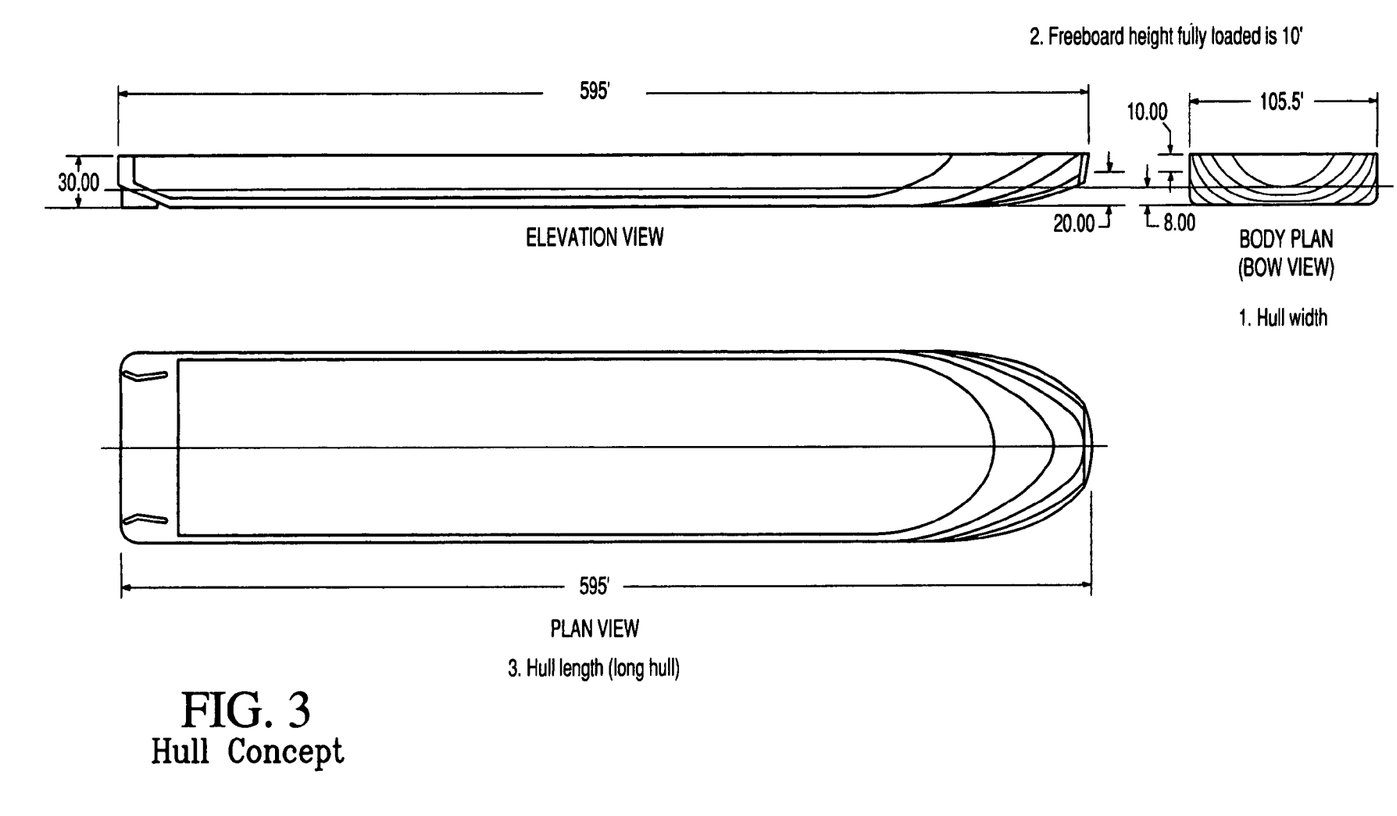
FIG. 3 Is a side elevation view and a plan view of the hull concept.

FIG. 3 Hull Concept

The proposed marine transport system and processing structures vessel hull design of the hull width is 105.5 feet wide 1. This is designed to match the USACE 110 foot wide lock after adjusting for entry and exit clearances. This hull design width of 105.5 feet can be compared to present shallow draft barges which are about 35 feet wide and have a maximum total tow width of approximately 105.5 feet wide. This width is commonly achieved by lashing traditional barges three-wide. In deeper brown water where there are no locks it is possible to lash over twice the number of traditional barges to a single tow. The proposed marine transport system and processing structures is compatible with this traditional configuration. The proposed marine transport system and processing structures vessel freeboard height 2, when fully loaded, is 10'. In the upper rivers where the draft is shallower, the freeboard of the invention is greater than the freeboard for a traditional tow which, at fully loaded draft, is approximately 5'. In the long sections of brown water where the water depth is greater than that ordinarily used by traditional tows, the additional freeboard of the proposed vessel makes open water transit safer. Equally as important, the proposed vessel can use more of the available depth and thus carry more cargo between ports on that deeper brown water portion of the route when compared to traditional tows. The proposed marine transport system and processing structures vessel 3 is 595' long. The shorter version is approximately 485' long depending upon the length of the tug. The proposed marine transport system and processing structures proposed vessel does not overwhelm ports with a difficult hull size. In Hubbard a specific reference is made to the various problems, including size, associated with the arrival of "Post Panamax" vessels. The proposed vessel matches the hull to the port slip. The proposed marine transport system and processing structures proposed vessel uses a bridge/gantry crane to process cargo with no extra or special assistance over a slip that is matched to the vessel. When Bylo processes cargo in a shallow draft port the vessel design requires changing the buoyancy of the vessels at certain fixed points so as to provide gravity-assisted transfer of cargo. Bylo requires exclusivity in its use in that in a shallow draft port, a traditional barge tow could not be used. The proposed marine transport system and processing structures is unrestricted by all industry/government standards. The proposed invention is operable by standard operators. Hamy requires a substantially unusual vessel design that is not traditional and which necessitates a substantially greater risk. His underwater vessel and chain of vessels requires total watertight configuration, operation by a special additionally qualified (submariner) crew and the risk of total failure of all the links in the chain were the primary vessel or any one of the others to founder. In vessel design, the ability to travel a route is often measured by meeting certain government standards.

Operating a submerged vessel requires a set of standards regarded by many to be very stringent.

Figure 4A:
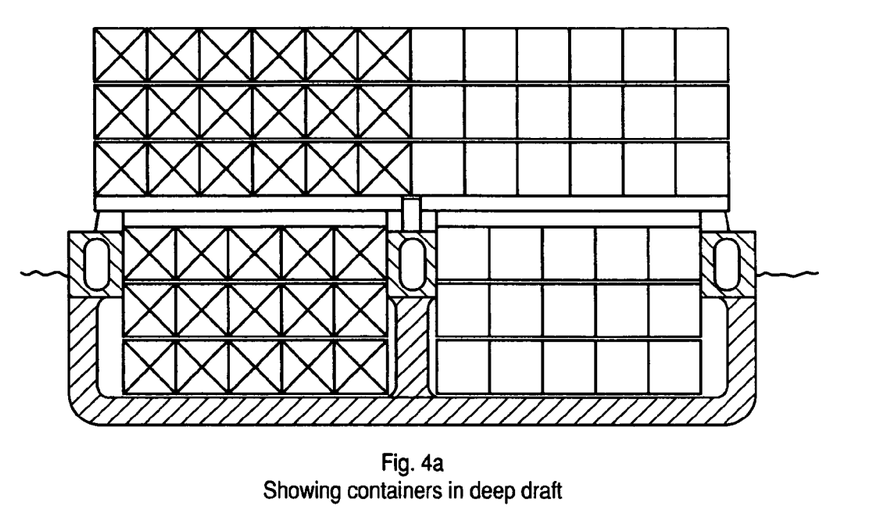
FIG. 4a Is a side elevation view of the containers in shallow draft.
Figure 4B:
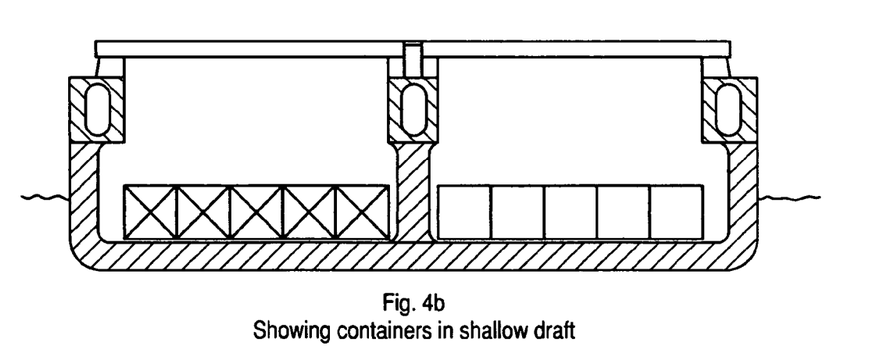
FIG. 4b Shows the side elevation of container cargo in shallow draft.
Figure 4C:
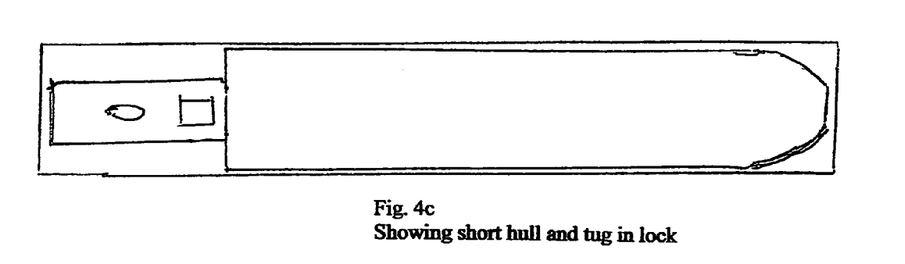
FIG. 4c Shows the short hull and tug matched to a lock.
Figure 4D:
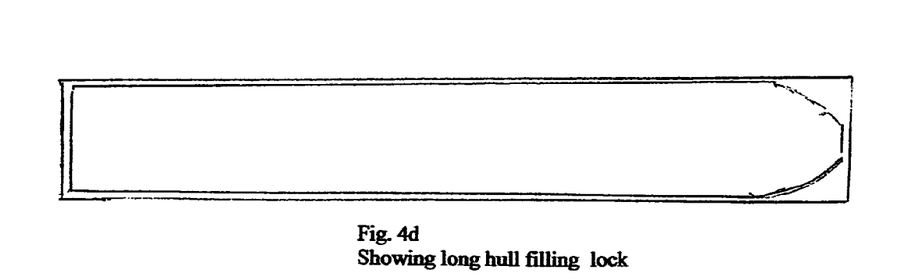
FIG. 4d Shows the long hull matched to a lock.

FIG. 4—Vessel carrying cargo showing (A) cross section in deep draft (B) cross section in shallow draft (C) top view—short hull and tug in 600' lock (D) top view—long hull in 600' lock The proposed marine transport system and processing structures proposed vessel FIG. 4a is configured so that as the water gets deeper the vessel displaces more water and therefore can take aboard more cargo. It does not incur deadweight as it goes into deep water. It does not need to use ballasting. Schmidt shows a variable-draft vessel which provides a cargo space when loaded in the shallow draft position. As the vessel approaches deep draft conditions in order to gain desired sea keeping advantages, Schmidt moves the deck of the center hull up into the hold area thus enabling the side hulls to draw more water and maintain the sea keeping advantages. In doing so, the cargo cubic foot of the vessel is substantially reduced. When the cargo hold is full, because the top of the hull has a roof there is nowhere for the displaced cargo to go. Schmidt regarding less available cargo volume. So the cargo must be offloaded to landside. Schmidt shows each of the side hulls and the center hull is in the water. According to Schmidt that combined buoyancy enables the vessel to be used for relatively heavy cargos and may be used in a barge-like manner. However, Schmidt then departs from having three hulls in the water and raises the center hull out of the water. To replace the buoyancy lost from raising the center hull out of the water Schmidt adds or enlarges the side hulls. Thus Schmidt now has additional or enlarged hulls beyond the three he originally started with in shallow draft. By raising the center deck flotation hull from out of the water, it remains on the vessel and does not provide any flotation and becomes dead weight. The proposed invention does not incur deadweight nor, as stated above, reduce displacement capacities when it enters deep water and therefore does not lose cargo capacity. In the proposed marine transport system and processing structures vessel, there is no waste of cargo space. Cargo of all types matched to the channel and lock is capable of being carried throughout the hull. In Leary's shallow draft, unfolded position, shows as an empty V-shaped space. This area is reserved to enable the invention to "fold" for deep draft configuration. No cargo is in the empty V-shaped space. The proposed vessel carries less cargo weight than either a Post Panamax or Panamax vessel. (Hubbard) The proposed vessel in the shallow draft ports places the cargo closer to the customer and reduces the need for rail or long haul trucks. Thus, it does not have to rail cargo to an assembly area miles away. The truck and rail access is directly on the landside of the port slip. In many cases these sites are also closer to their originating or terminating facility than at the crowded Panamax ports. These Panamax vessels often land or pick up their cargo at hubs far from the origination of destination of the cargo. FIG. 4b—Hull cross section in shallow draft Hamy uses "ballasting" to raise and lower his vessel in the water. Ballasting often requires additional chambers and mechanisms to operate which adds to weight and space that reduces the space available for cargo. The proposed invention does not raise and lower the vessel in this manner thus avoiding these problems. FIG. 4c and FIG. 4d The proposed marine transport system and processing structures proposed vessels, allowing for entry and exit clearances, the invention is said to be designed to "match" the locks. The controlling lengths in both arrangements described below are the size of the available locks: the larger 1,200 foot long locks or the 600 foot short locks (where the lock designer is the USACE). In matching the existing locks, the first and smaller length option of the proposed vessel is dependent on the length of the tug that is pushing the barge with respect to the lock length. Thus, with a 100 foot long tug, the vessel length would be 485 feet long for a shorter lock. The larger vessel, without the tug, would be 595 feet long. There are other waterways with different lock sizes (mostly narrower), and different channel depths (some deeper) for which a hull can be matched to a channel, the lock, and the slip. The proposed marine transport system and processing structures vessel tow requires two passes to lock through as do the 15 traditional barge tows. The hull is designed in two 595' sections to each pass through the 600' locks. This provides access to the many shallow draft ports which an inseparable tow over 600' could not reach because of shorter lock lengths. The proposed invention addresses the locks presently available and thus transits the 600 foot lock in two passes. By matching the proposed vessel to lock length, width and draft the vessel has the potential of transporting more cargo, especially ocean containers, through the locks on any given passage than could be processed through the same lock using the present multi-barge arrangement. The proposed marine transport system and processing structures vessel can have additional traditional barges attached to make the tow wider and longer as now happens where channel width is available and there are no locks. This shows that the proposed invention follows the traditional capability. Bylo uses a separate shallow draft in-port vessel to compensate for when shallow draft in the slip is needed. In the proposed invention, matching the proposed marine transport system and processing structures to the port draft permits that vessel to eliminate the need for any intermediate vessel as described by Bylo. The proposed marine transport system and processing structures use ISO containers to fit the lock and port configurations. While no actual dimensions were provided by Hamy, it is unlikely that the magnum constant modules described would be adaptable to US roads and bridges for overland transportation. The ISO container is already matched to the US highway dimensions and any other container wide enough to hold truck trailers would be too wide to fit onto or inside truck trailers. For the proposed invention, all containers used are standard. Hamy's smaller container modules can be transported over the highways with two of them equaling one ISO container. For the same amount of cargo trucked there is more dead weight and less cargo space with the Hamy option which has sides and doors. Hamy's proposed containers are also watertight to the degree that they can be submerged which adds more weight thus reducing cargo capacity even more when compared to ISO containers. Hamy containers fit ISO dimensions but they do not match ISO containers as the designs are ultimately exclusive. They are exclusive because they are either water-tight or inside water-tight vessels that can be submerged. The proposed invention specifically is designed to be compatible with the present ISO container and needs no modifying of the containers. Prior art has focused on the best designs minimize the number of steps while moving cargo. Hamy, by submerging and resurfacing, adds substantially to the number of steps.

Figure 5:
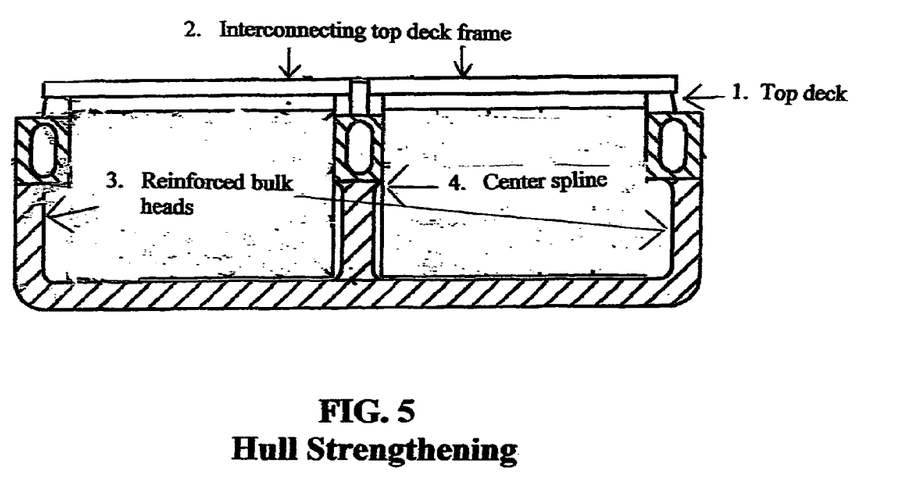
FIG. 5 Shows a cross section of the hull and how it is strengthened.

FIG. 5—Vessel Cross Section Showing Hull Strengthening

The marine transport system and processing structures vessel requires strength to transit sea states and the deep draft, blue water. It strengthens its vessel hull with added structure in contrast to traditional inland barges. This strength enables the proposed vessel to transit sea states as a deep draft, blue water vessel yet carry cargo over shallow draft, brown water routes. Traditional inland waterways barges do not have the strength to withstand the open seas. Their lashed barges would part, the light bulkhead be crushed, and most likely the barges would swamp and sink. Conversely, a deep draft vessel requires more water than is available on inland waterways and would run aground. The strength is achieved by adding steel or other strong structural materials. Johnson (U.S. Pat. No. 5,488,918) has an inland barge with a bow, a stern, elongated sidewalls extending between the bow and the stern, and a bottom interconnecting the bow, stern, and sidewalls. The proposed vessel improves on this by incorporating those features, plus the design has added a top deck 1 and frame 2 interconnecting the bow, stern and sidewalls, reinforced bulkhead 3 through additional steel and other stronger materials, a center spline 4, higher freeboard, and hatches. For comparisons purposes, the steel dead weight of a 595' hull is approximately 2.5 times the dead weight of 9 traditional inland waterway open barges. Naval architects on deep draft vessels make hull design calculations based on optimizing the economics of the trip. Johnson has made a bow designed for a slow speed inland water way operation only. The proposed system is designed using calculations for combined inland waterway and short sea shipping, i.e. both deep draft and shallow draft.

Figure 6:
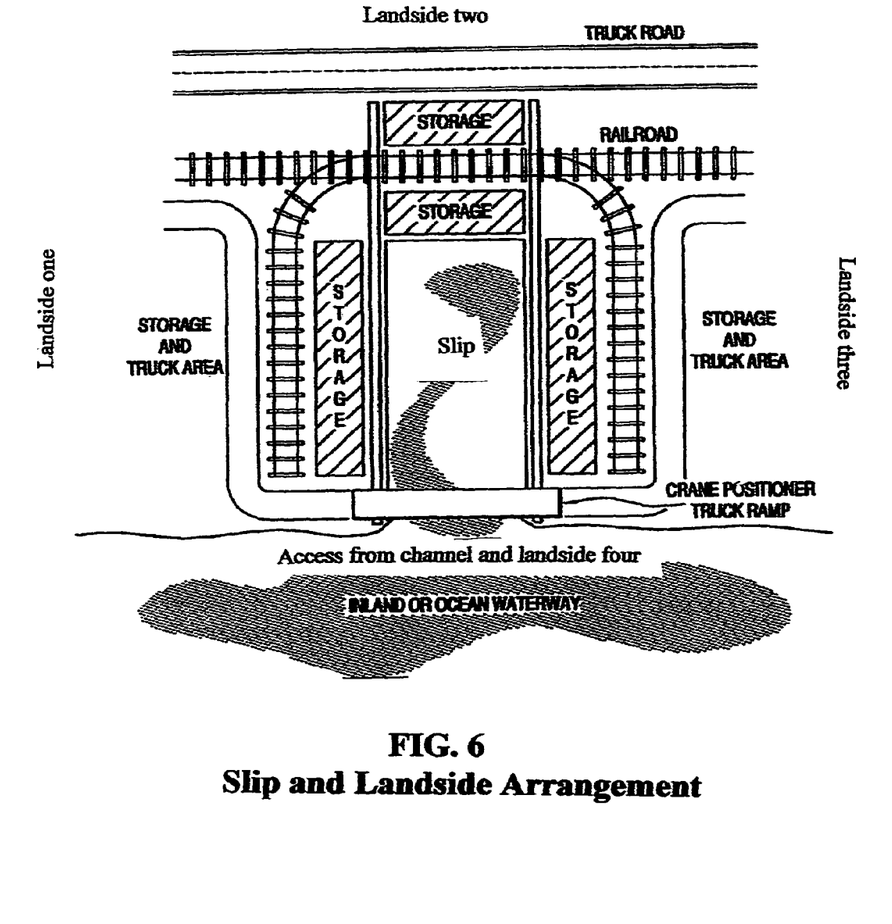
FIG. 6 Shows the matched slip and landside arrangement.

FIG. 6—Slip and Landside Arrangement

Figure 7:
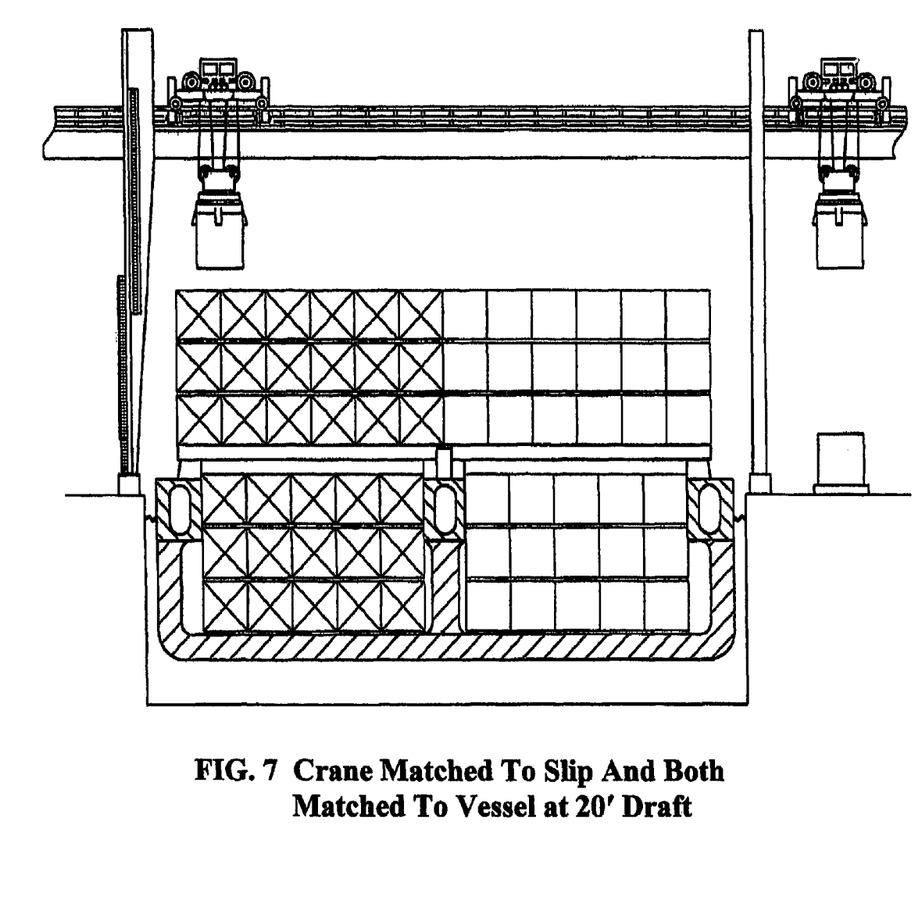
FIG. 7 Shows how the crane is matched to work with the slip and how both the crane and slip are matched to work with the vessel.

The proposed marine transport system and processing structures slip is designed to match the vessel and provide economy of movement in processing cargo FIG. 6. The vessel, with allowances for entry and exit, fully occupies the slip thus enabling loading to take place on two long sides and one or two short sides of the vessel. The vessel position allows more cargo to be stored immediately next to the vessel, sorted and stacked in desired categories for loading or unloading. (Hubbard) If stacked, the containers can be moved by fork lifts or loaded onto trucks and rail cars directly by the gantry crane at the slip without resorting to shuttles. Because loading for the proposed marine transport system and processing structures occurs at many small ports, the need for rail and container sequencing is not necessary as on the long inland waterways there is plenty of space for slips and for final destination trucks and final destination rail cars to go directly to the slip. The proposed marine transport system and processing structures permits the use of the shallow draft part of deep draft ports. This land often is the most available and least expensive. The invention also uses silted up ports which have been more or less abandoned because the average draft of the ocean vessels increased or the silt filled the port thus requiring significant dredging. In many such under-utilized ports, compatible draft to place a slip (matched to the invention) is very much an option. The proposed marine transport system and processing structures unloading processing—the horizontal travel of the cargo from the hold to the landside—is minimized because the distance that the cargo has to travel to the edge of the slip is on average approximately 27.5 feet less than were the same cargo to be unloaded from only one side as in the traditional port. The invention, by fitting the hull to the landside slip, reduces the cargo movement of a crane spanning and serving multiple hulls. The proposed marine transport system and processing structures is compatible with much of barging "legacy operations". The proposed vessel can be loaded from a single side quay, it can be loaded by an ocean container crane, or a common boom crane FIG. 7—Showing Crane Matched to Slip and Both Matched to Vessel In the proposed marine transport system and processing structures FIG. 7 spanning the slip and vessel is a matched to a crane. The gantry/bridge/straddle crane span is over the 110' slip and on each end of the crane there is an extension. This span permits the gantry crane hooks/spreaders to be positioned over the cargo at any point in the hull. The extensions are designed so that the hook/spreader on the crane can access stacked cargo/ocean containers on the ground, on trucks, or on rail cars. This extension could be as much as 54' on each end but more commonly would be 20'. The proposed slip with matched vessel loads and unloads from either side. By matching the crane to the single vessel height a lower height crane can be used, the proposed crane is approximately ½ the height of a deep draft Panamax crane. The crane also has a plurality of hooks/spreaders, most commonly 3, traveling on one bridge thus further facilitating the speed of removal of arriving and loading of departing cargo both in a faster sequence of product arriving landside and in the repositioning of cargo within the hull to maintain a uniformly loaded hull. Because of the plurality of the hooks/spreaders on the same bridge it is possible to use the same bridge to process cargo to both sides of the slip at the same time. Because of the length of the slip a plurality of cranes can operate over the slip again speeding up the unloading processing so that the vessel can be reloaded and depart on its way. The invention addresses cargo other than that loaded by a hook or spreader. Cargo can also be loaded by rolling it on and off, using a conveyor, air handling, vacuuming and pumping. These options replace lifting by the crane but they too can be matched to the slip so that horizontal distance of cargo movement is minimized. All previous and subsequent attributes of the invention will apply to these types of cargo as well. Donnelly only receives cargo at one side of the slip, to be removed from a barge delivered at the other side of the slip. Donnelly does not provide for the slip to be full especially on the long sides thus increasing the average cargo moving distance traveling over the empty slots. Donnelly requires a crane to be spanned over the vessel at a sufficient height to clear the highest vessel in the slip. Also Donnelly references two heads (hooks) over moving over the cargo. The proposed invention further addresses the difficulty the present traditional tow encounters in processing mixed destination cargo, especially ocean containers, in any quantity. The fitted landside processing eliminates this logistic consideration. Thus at Port B the proposed invention enters the familiar matched slip being 110 feet wide, by 1,200 feet or 600 feet long and with a shallow draft to match that of the channel at the slip. Traditional barge in stream fleeting efforts in shallow drafts waters can encounter logistic problems in getting single containers from a number of fleeted barges to their designated port. The proposed invention, by going directly to the matched slip, requires but one lift from the Port A and Port B crane to or from the landside. No intermediate ballasting, added transfers to intermediate vessels or shuttle vessels are needed. By avoiding exclusivity except where the marine transport system and processes do not exist at all, the use of presently available ocean containers and local trucks are a further addition to matching the transporting system to the legacy systems that other systems such as Bylo do not achieve. Bylo, in processing cargo at any one port, uses a combination of a landside dock structure, a slip, a ballasted buoyant unit, an above water cargo hold unit, preferably an in-port transfer vessel, and an access deck connection to the land side. Ballasting raises and lowers cargo, tilted gravity operated roller conveyor or forklifts move cargo. In addition, there is a self-propelled shuttle vessel. Containers in the proposed invention are vertically loaded and unloaded by cranes, easily accessible and processed in the standard manner. The Leary design is detrimental to the efficient loading of ocean containers when compared to the proposed invention. Ocean containers are usually positioned in side the hull guided by container rails. Containers themselves are lowered into or raised from the guide rails in a vertical motion. If standard ocean containers are loaded into the Leary hull in the shallow draft position, when the hull is converted to deep draft the containers are tipped toward the centerline making them exceptionally difficult to unload. Furthermore, in the shallow draft position, access hatches are angled away from the vertical, making loading of containers into container rails very difficult.

Military Application

Military cargos could also work with this marine transport system and processing structures. Where a military supply is required to an undeveloped or damaged port, especially the shallow draft portion, there often is a seawall or an embankment that can quickly be converted to a long single sided quay with a sheet steel bulk head and apron. In the marine transport system and processing structures, the start could be Port A many miles away with propositioned cargo and could result in cargo arriving at the desired military shallow port without any transshipment in between. At some expense of cargo processing efficiency, a crane(s) or other offloading devices compatible with the cargo can be mounted on the hull and the cargo offloaded at Port B. Although ship mounted cranes used from only one side of a vessel are not efficient, these could be offset by the early arrival of heavy cargo to the desired port and thus possibly a net benefit to the military.

The invention claimed is:

1. A shallow draft brown water to deep draft open seas blue water marine transport system and processing structures of barging cargo comprising an improved barge vessel having a hull, bow, stern, deck, sidewalls, and cargo space that is self-powered or tow able, The improved barging vessel comprises,
    a barge formed with hull dimensions between 485 feet and 595 feet long and 105.5 feet wide, which match the US Army Corps of Engineers locks having a minimum dimension of 600 feet long by 110 feet wide, and a draft of 9 feet or shallower to mach the minimum shallow part of the system referred to as brown water,
    strengthening the barge to withstand open seas by added steel or other strong structure material, an additional deck and frame interconnecting the bow and sidewalls, a reinforced bulkhead, a center spline, higher freeboard and hatches,
    the system of barging cargo on the improved barge vessel may transport cargo between a first port, over shallow brown water, through channels and locks, over deep blue water and discharges the cargo at a second port with no transshipment in-between.

2. A marine transport system of barging cargo according to claim 1, wherein the system further comprises:
    dock slip means at each port served by the system,
    means cooperating between the single barge vessel and the dock slip means that enable loading or unloading to take place on two long sides and one or two short sides of the barge vessel.

* * * * *